United States Patent
Stava

[19]

[11] Patent Number: 6,025,573

[45] Date of Patent: Feb. 15, 2000

[54] CONTROLLER AND METHOD FOR PULSE WELDING

[75] Inventor: Elliott K. Stava, Sagamore Hills, Ohio

[73] Assignee: Lincoln Global, Inc., Cleveland, Ohio

[21] Appl. No.: 09/175,022

[22] Filed: Oct. 19, 1998

[51] Int. Cl.[7] .................................................. B23K 9/095
[52] U.S. Cl. ............................... 219/130.21; 219/130.01; 219/130.51; 219/137 PS
[58] Field of Search ................... 219/130.21, 130.01, 219/130.31, 130.32, 130.33, 137 PS, 130.51

[56] References Cited

U.S. PATENT DOCUMENTS

| | | | |
|---|---|---|---|
| 3,792,225 | 2/1974 | Needham et al. | 219/130.21 |
| 4,300,036 | 11/1981 | Johansson | 219/130.33 |
| 5,272,314 | 12/1993 | Moriguchi et al. | 219/130.21 |
| 5,457,300 | 10/1995 | Karino et al. | 219/130.32 |
| 5,521,354 | 5/1996 | Ludewig et al. | 219/130.21 |

*Primary Examiner*—Clifford C. Shaw
*Attorney, Agent, or Firm*—Vickers, Daniels & Young

[57] ABSTRACT

In a power supply for creating a voltage to cause a current pulse between a consumable electrode and a workpiece to melt the end of the electrode into a droplet and propel the droplet toward the workpiece, where the power supply has a plurality of pulse controlling parameters, the improvement comprising: means for determining the real time dv/dt of the voltage during the current pulse; means for creating a detect signal in response to the real time dv/dt shifting from a negative value to a positive value; and means for adjusting at least one of the welding parameters in response to the detect signal.

57 Claims, 11 Drawing Sheets

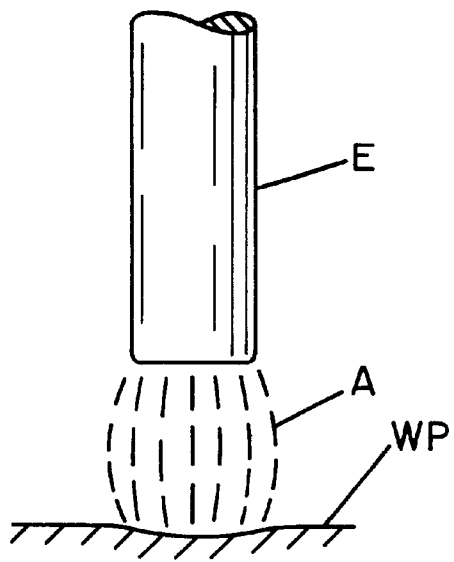
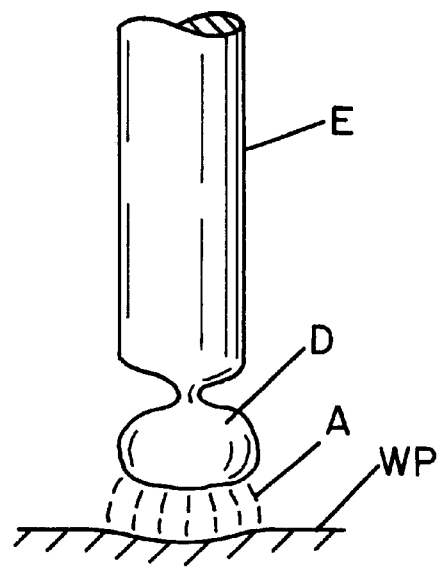
FIG. 1  FIG. 1A
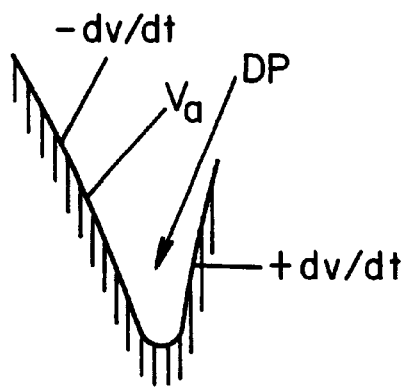
FIG. 2A

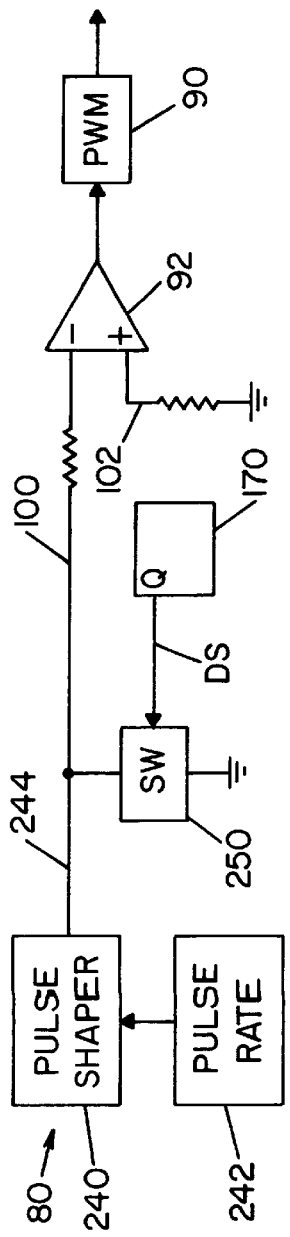
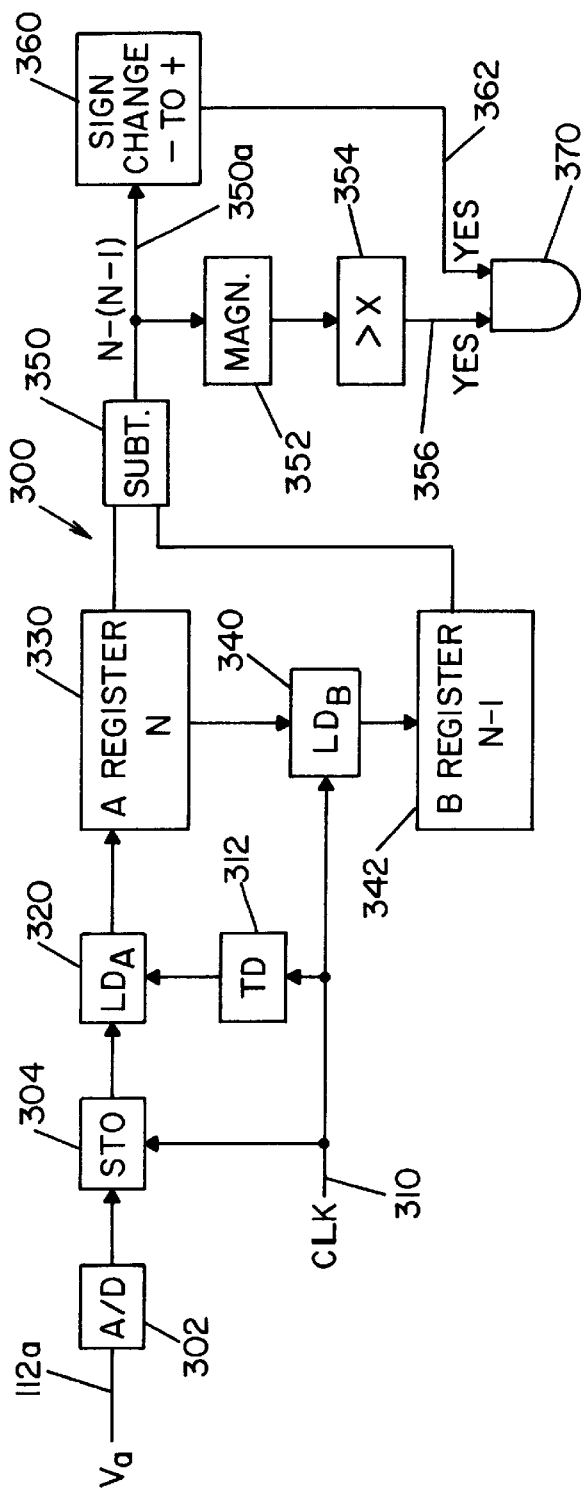
FIG. 16
FIG. 17

CONTROLLER AND METHOD FOR PULSE WELDING

The invention relates to the art of arc welding and more particularly to an improved controller and method of using the controller for implementation of a pulse arc welding process.

BACKGROUND OF INVENTION

Several arc welding methods are employed for consumable electrodes wherein the electrode is melted by current flow through the electrode, across an arc and to a workpiece. Such welding processes are divided between transfer of the molten metal from the consumable electrode to the workpiece by a surface tension, short circuit transfer mechanism or a non-short circuit transfer mechanism. In molten metal transfer of the type not involving a short circuit component, the molten metal on the end of the electrode is transferred across the electric arc to the weld puddle by way of electromagnetic forces. In such processes, the consumable if electrode should not contact the molten metal puddle constituting the workpiece. In these non-short circuit metal transfer processes for electric arc welding, a common procedure is either a spray transfer or pulse transfer. Since spray transfer requires a substantial amount of energy and high heat input at the molten metal puddle, in electric arc welding of the non-shorting type when lower heat is desirable, a pulse welding process is used. The pulse process utilizes lower heat to generate a less fluid molten metal puddle on the workpiece. This facilitates out of position welding and improves various mechanical aspects of the welding process.

The present invention relates to the implementation of a pulse welding process which improves the welding characteristics. In the past, a high current pulse was applied across the arc between the electrode and the workpiece at least when the molten metal droplet is formed on the end of the electrode. This high current pulse causes the droplet or molten metal mass on the end of the electrode to separate from the electrode by an electric pinch action, after which the molten metal mass or droplet is propelled across the arc to the molten metal puddle constituting the workpiece. The energy in the current pulse used for separating and propelling the molten metal to the workpiece is an important parameter of the overall welding process. The electric pinch action exerted on the droplet to constrict and separate the droplet from the electrode is proportional to the square of the applied current during the current pulse. Therefore, it would appear that greater applied current during the separation of the molten metal would result in a more rapid separation of the droplet for transfer to the workpiece and consequently a superior welding process. However, current flowing through the arc during the welding process exerts a magnetic force on the molten puddle, pushing the puddle downwardly away from the end of the consumable electrode. Such downward force on the molten metal in the puddle pushes the molten metal outwardly and results in a puddle depression below the electrode. This depression and the associated electromagnetic forces can cause extreme weld puddle agitation, especially when welding metals having low specific gravity, such as aluminum. The high energy created puddle agitation produces a poor appearance for the weld bead and unduly deep penetration of the metal into the workpiece being welded. Consequently, the parameters of the current pulse necessary to create an effective electric pinch of the droplet from the electrode must be accurately controlled to optimize the pinch action, but also to minimize the puddle agitation.

The magnitude and shape of the current pulse used in the pulse welding process accomplishes this objective by reducing the amount of energy so that the pulse results in a smooth metal transfer and a minimum puddle agitation. The amount of energy in the current pulse is important; however, it is generally compromised to optimize diverse requirements of the welding process.

Most power supplies used for electric arc welding in the pulse welding mode have a variety of individual controls for adjusting the shape of the current pulse and/or the rate of the current pulse. Adjustment of the power supply to obtain a single droplet for each current pulse produces a very desirable performance. If the current pulse does not contain sufficient energy, the electrode does not melt and separate before the moving electrode engages the weld puddle to create an inadvertent undesirable short circuit. When this occurs, a substantial amount of spatter is generated in the welding process. Thus, the electric pulse must have a certain amount of energy to allow efficient metal transfer and avoid spatter creating, short circuit conditions. However, if the energy in the current pulse is too great, severe puddle agitation occurs as previously described and the molten metal on the end of the workpiece may be remelted to produce enlarged molten metal balls. This phenomena usually causes a premature shorting during the current pulse in a subsequent weld cycle. Due to these characteristics of a pulse welding process, the electric current pulse is extended to assure transfer even though such current pulses are too lengthy and cause puddle agitation.

THE PRESENT INVENTION

The present invention relates to a controller, method and system for pulse welding by an electric arc welder, which controller, method and/or system control the pulse parameters in a manner to develop an improved pulse welding operation. The essence of the invention involves detecting when the molten metal ball or droplet has actually separated from the end of the consumable electrode by sensing this physical event and creating a detect signal upon the occurrence of this event. The welding process can be controlled by the detect signal to create great flexibility. In operation, the physics of the welding arc are utilized in determining droplet transfer. As the consumable electrode, with its molten metal tip, or droplet approaches the weld puddle, the arc voltage is reduced to create a negative value for the real time dv/dt. When the droplet detaches from the end of the electrode, the arc voltage increases to create a positive value for the dv/dt of the arc voltage. By calculating the rate of change of the arc voltage and detecting when the voltage, during a current pulse, shifts from a negative dv/dt to a positive dv/dt, droplet detachment is determined. Such droplet detachment occurs when there is a change in sign of the derivative of voltage from a negative value to a positive value. This event creates a detect signal which detect signal is used interactively to control the current pulse. By detecting droplet transfer, the detect signal immediately terminates the current pulse. Consequently, the energy in the pulse is set by the actual physical characteristics of the droplet transfer. This is an improvement and novel concept, which novel concept is used in a controller, method and/or system for adjusting the pulse welding process interactively. Thus, the current pulse is automatically adjusted to the desired length and energy necessary to separate the droplet from the end of the electrode during each current pulse. By merely detecting transfer of the droplet as it is propelled through the arc, the shape of the pulse, the length of the pulse, the voltage of the pulse, or other parameter can be adjusted to facilitate improved electric arc welding in the pulse mode. Essentially, the derivative of the voltage that creates the electric pulse is determined in an absolute sense and a detect signal is created when the absolute derivative changes signs from a negative value to a positive value during the actual current pulse.

In accordance with the present invention there is provided an improvement in a power supply for creating a voltage that causes a current pulse between a consumable electrode and a workpiece to melt the end of the electrode into a droplet and propel the droplet toward the workpiece. The power supply has a plurality of pulse controlling parameters, such as pulse length. By determining the real time dv/dt of the voltage during the current pulse and creating a detect signal in response to this real time dv/dt shifting from a negative value to a positive value, at least one of the parameters in the pulse welding process can be adjusted interactively. Thus, the power supply controller terminates the pulse when there is a transfer of a droplet. The length of the current pulse is no longer than necessary for implementation of the pulse welding process. This feature realizes a distinct advantage by establishing a proper pulse length for each transfer pulse. In addition, this invention causes a single droplet to be transferred during each current pulse. By merely lengthening the current pulse and terminating the current pulse at droplet separation, a superior welding process is accomplished.

In accordance with another aspect of the present invention, there is provided a controller for an electric arc welder using a voltage to create a current pulse to melt the end of the consumable electrode into a droplet and propel the droplet toward a workpiece. This controller includes means for terminating the current pulse upon creation of a detect signal and means for creating the detect signal in response to the real time dv/dt of the voltage during the current pulse shifting from a negative value to a positive value. By using this controller, the pulse welding procedure of the welder is controlled to obtain the advantages discussed above.

Yet another aspect of the present invention is the provision of a method of operating a power supply that creates a voltage to cause a current pulse between a consumable electrode and a workpiece to melt the electrode into a droplet and propel the droplet toward the workpiece. The power supply has a plurality of pulse controlling parameters. This method involves determining the real time dv/dt of the voltage during the current pulse, creating a detect signal in response to the real time dv/dt shifting from a negative to a positive value and adjusting at least one of the parameters of the power supply in response to the detect signal.

In accordance with the invention, there is provided a device for detecting the detachment of a mass of molten metal on the end of a consumable electrode during a current pulse in the pulse welding process. This device comprises means for determining the real time dv/dt of the voltage creating the current pulse and detecting when the real time dv/dt shifts from a positive value to a negative value during the current pulse. A negative value for the derivative during a current pulse sets the device for subsequently determining a shift to a positive derivative.

The primary object of the present invention is the provision of a controller, method and system for controlling a pulse welding process or pulse welder, which controller, method and system utilize a shift between a negative derivative of the voltage creating the current pulse and a positive derivative of this voltage during the current pulse itself.

Another object of the present invention is the provision of a controller, method and system as defined above, which controller, method and system control a pulse welding process or pulse welder in a manner to improve the bead and welding characteristics of the process and welder performing the process.

Yet another object of the present invention is the provision of a controller, method and system, as defined above, which controller, method and system control a parameter of the current pulse based upon a real time event during the pulse to reduce the amount of puddle agitation, spatter and/or inadvertent shorting of the electrode against the workpiece.

Still a further object of the present invention is the provision of a controller, method and system, as defined above, which controller, method and system can be used with existing electric arc welders when they are operated in the pulse mode of operation without substantial cost in the modification of the controller and without substantial changes in the overall construction of the welder or its power supply.

Another object of the present invention is the provision of a controller, method and system, which controller, method and system reduces the heat in the weld puddle and is extremely beneficial for welding thin gauge workpieces.

These and other objects and advantages will become apparent from the following description taken together with the accompanying drawings.

BRIEF DESCRIPTION OF THE DRAWINGS

FIG. 1 is a side elevational view showing a welding operation including a consumable electrode spaced from a workpiece with a plasma arc for melting the end of the electrode;

FIG. 1A is a view similar to FIG. 1 illustrating the formation of a molten metal mass, or droplet on the end of the electrode in accordance with standard welding process;

FIG. 2A is an enlarged portion of the voltage wave form indicated by the circle in FIG. 2;

FIG. 16 is a block diagram and wiring diagram of a modification to the arc welder shown in FIG. 10 for implementing the present invention utilizing the circuits shown in FIGS. 12 and 14;

FIG. 17 is a schematic block diagram showing a digital circuit for practicing the present invention, which circuit can be implemented in software by a computer, such as a microprocessor; and, FIGS. 18–20 are current and voltage pulses with related illustrations of the resulting welding operation utilizing the prior art in FIGS. 18 and 19 and the present invention in FIG. 20.

PREFERRED EMBODIMENT

Figure 2:
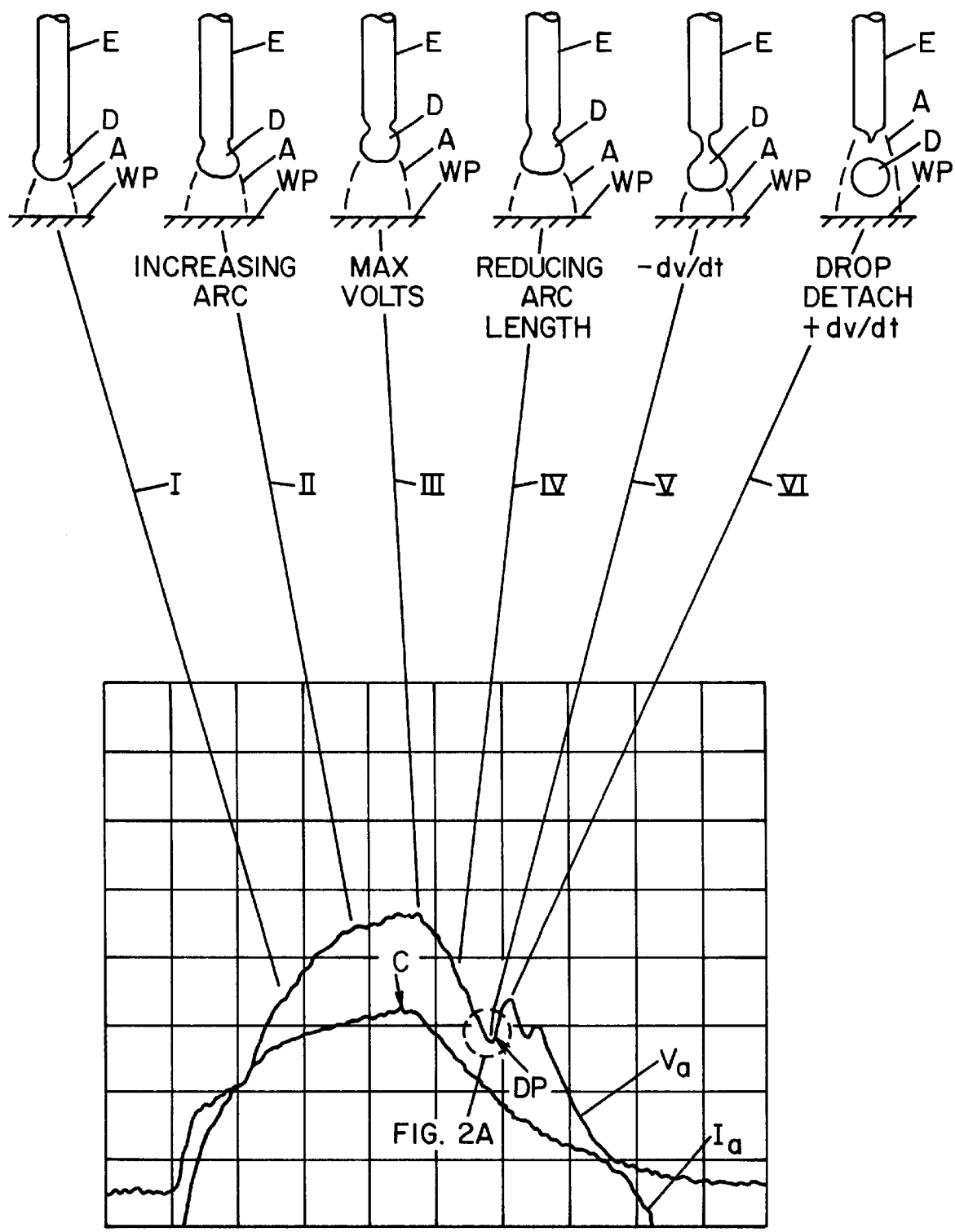
FIG. 2 is a combined chart showing the arc voltage and current pulse in a pulse welding process with schematic representations of the physical characteristics of the electrode at each portion of the voltage.

Referring now to the drawings wherein the showings are for the purpose of illustrating preferred embodiments of the present invention and not for the purpose of limiting same, FIGS. 1, 1A and 2 show the mechanics of a standard pulse welding operation wherein consumable electrode E, in the form of an advancing welding wire, is directed toward a workpiece WP in the form of a molten metal puddle. Arc A created between the electrode and workpiece melts the end of electrode E to form a molten metal mass or droplet D, which droplet is electrically pinched from the electrode by the current flow and is propelled from the electrode to the molten metal puddle by the electromagnetic force of arc A. The mechanical aspects of electric arc A during a pulse welding process, and its effect upon electrode E and workpiece WP is schematically illustrated in FIG. 2 as it relates to the current pulse C of arc current $I_A$ created by arc voltage $P_A$.

Figure 3:
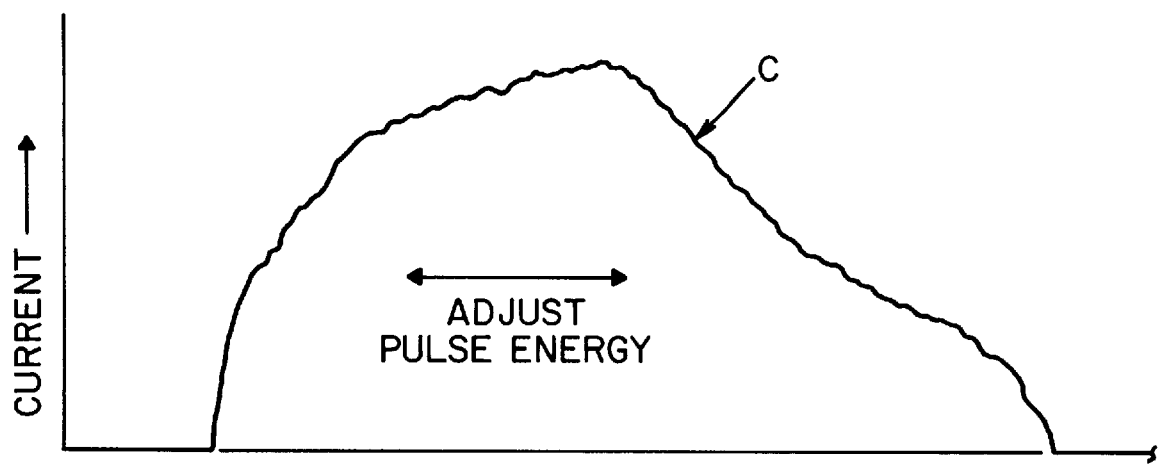
FIG. 3 is a graph showing a current pulse used in prior art pulse welding processes.
Figure 7:
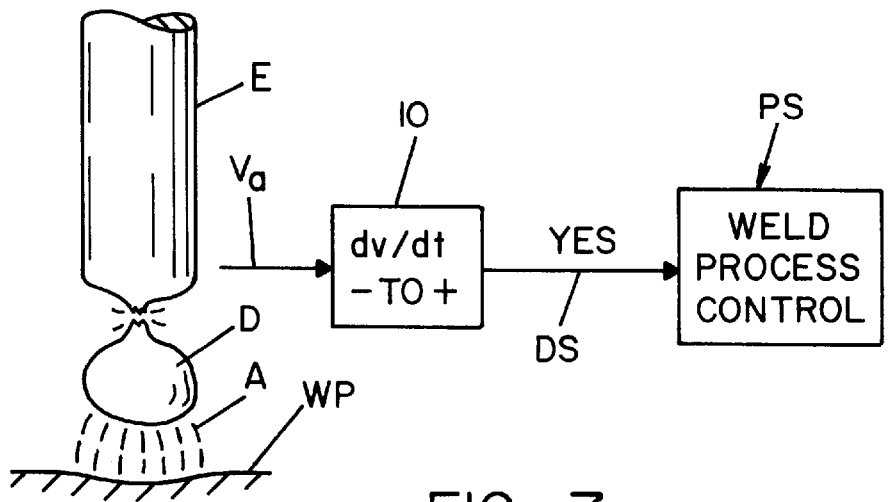
FIG. 7 is a side elevational view illustrating a welding operation as shown in FIGS. 1, 1A and 2 with a block diagram representing the basic feature of the present invention.

As shown in FIG. 2, a controller for the electric arc welder creates a series of current pulses C having a desired shape normally controlled by a pulse width modulator incorporated in the power supply of the electric arc welder. Current pulse C melts the end of electrode E forming droplet D and propels the droplet across arc A to the workpiece for the welding operation. At stage I arc voltage $V_A$ increases causing an increase in current $I_a$ forming the initial portion of pulse C. Electrode E is advancing toward the workpiece and arc A has an increased intensity as the voltage increases to cause an increase in arc current as shown at stage II. Ultimately, the weld process reaches stage III where a maximum voltage causes a maximum current in current pulse C. Droplet D continues to form as electrode E advances toward workpiece WP. At stage IV, droplet D has started to neck down due to the pinch effect of current flowing through the electrode. This action reduces the arc length at stage IV and initiates the downward directed time constant slope of current pulse C. This process continues with the electrode E advancing toward the workpiece and the electric pinch action caused by the current flow effecting the separation of droplet D. During this time, the derivative of the arc voltage $V_a$ is a negative value since the voltage is decreasing due to the reduced length of the arc. This negative derivative of the arc voltage continues as shown at stage V until the necking action caused by the electric pinch effect actually separates droplet D. At that instant, the voltage immediately increases to create a positive derivative of the arc voltage as shown at stage VI. This shift from a negative value for the real time derivative of the arc voltage to a positive value for this derivative is exhibited as a dip DP in arc voltage $V_a$ shown in FIG. 2. An enlarged representation of the voltage dip is shown in FIG. 2A. This dip is an electric phenomena caused by the mechanical aspects of the welding process going through the stages set forth in the upper portion of FIG. 2. After voltage dip DP occurs, current $I_a$ continues to complete the formation of the desired current pulse C, as shown in the lower portion of FIG. 2. The present invention utilizes these electrical and mechanical phenomena of a pulse welding process to control the welding process as schematically illustrated in FIG. 7 wherein detector 10 reads the value of arc voltage $V_a$ and creates a detect signal DS when there is a shift from the negative value of the arc voltage derivative to a positive value of this derivative during the current pulse itself. Detect signal DS is directed to a standard controller of an electric arc welder power supply PS to adjust a parameter in the pulse welding process. In the preferred implementation of the present invention, the controlled parameter is the length of current pulse C as schematically illustrated by comparison of FIGS. 3 and 4. In FIG. 3, pulse C is fixed during the operation of the power supply. To control the amount of energy or physical separation of droplet D, the shape of pulse C is adjusted by changing the length or by other changes in the operation of the pulse width modulator of the controller used in power supply PS. In accordance with the invention, as broadly illustrated in FIG. 7, when signal DS is created, this detect signal causes the pulse width modulator to immediately shift current $I_a$ to a low value as shown at point 20 in FIG. 4. Thus, portion 22 of the current pulse C is removed. As soon as the droplet separates from electrode E, the pulse C is shifted to a low level, which level may be zero or even a negative current to reduce the amount of energy in the welding process. By using the present invention, detection of dip DP terminates the current pulse based upon an event during the pulse. Consequently, a single droplet is transferred during each pulse and the correct amount of energy is utilized during each current pulse.

Figure 4:
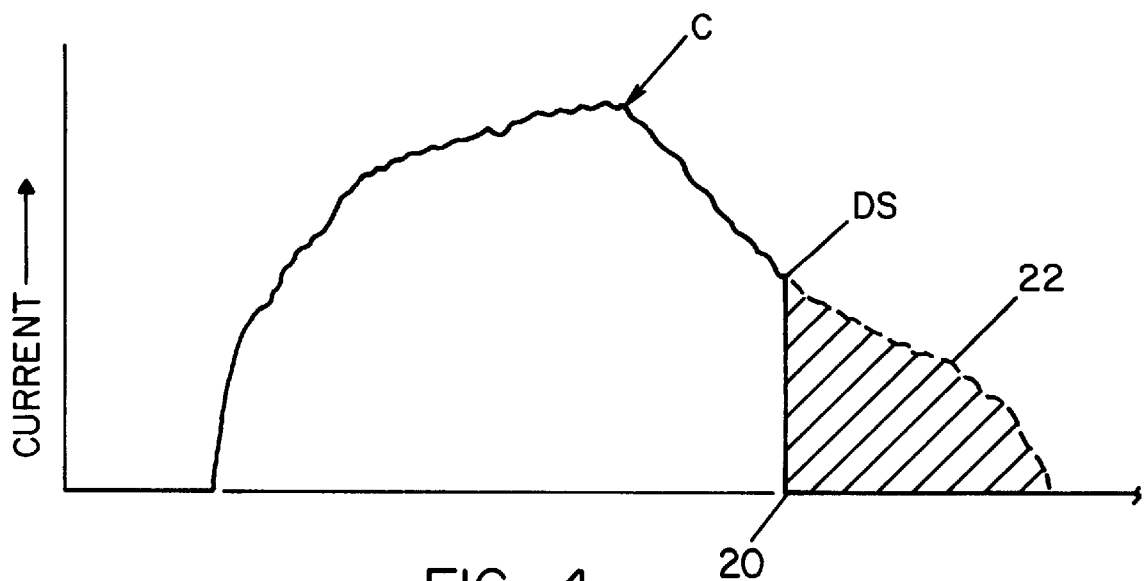
FIG. 4 is a graph similar to the graph in FIG. 3 showing an aspect of the present invention.
Figure 5:
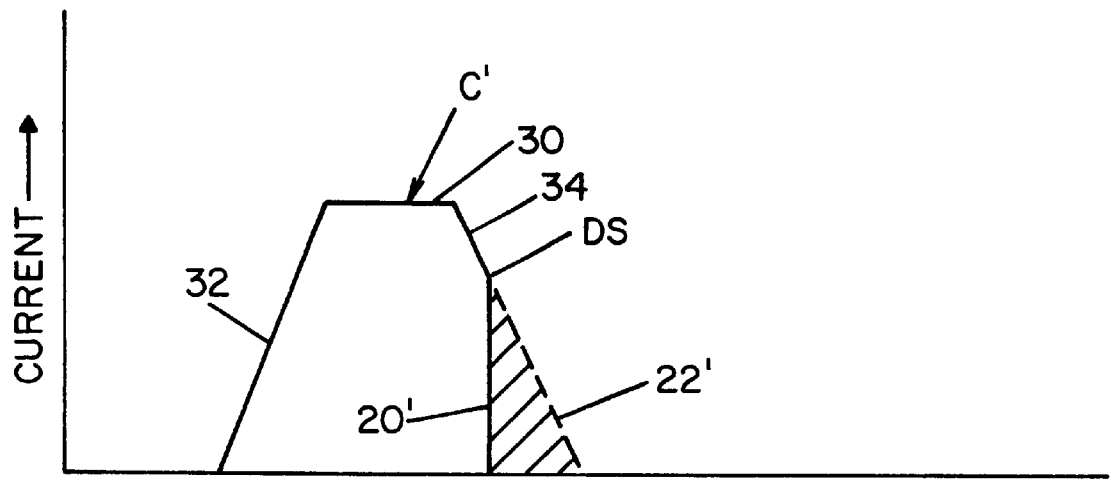
FIG. 5 is a graph representing a current pulse controlled in accordance with the present invention.
Figure 6:
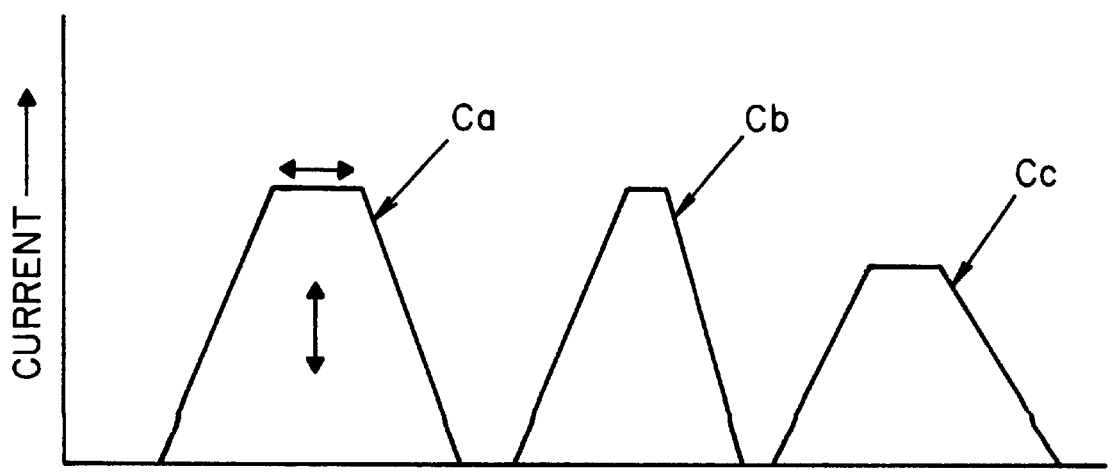
FIG. 6 is a graph similar to FIG. 5 showing a series of current pulses controlled in accordance with the prior art process.

To schematically illustrate the advantage of the present invention, FIG. 5 shows a representative current pulse C' which has a nondescript shape with a maximum current level 30, input ramp 32 and trailing ramp 34. In accordance with the present invention, detect signal DS occurs upon appearance of dip DP to immediately shift pulse C' at point 20' to save energy represented by the portion 22'. In the past, current pulses were shaped and controlled for repetitive presentation of the same current pulses during the welding process. As shown in FIG. 6, the maximum current, the leading and trailing ramps and the rate of pulses were adjusted to control the welding process. Different current shapes are schematically represented as current pulse Ca, Cb and Cc. In accordance with the present invention, these adjustments may be made on a pulse by pulse basis determined by the appearance of detect signal DS. The primary implementation of the present invention is the provision of a large pulse length with a termination of the pulse upon the creation of signal DS as schematically illustrated in FIGS. 4 and 5.

Figure 8:
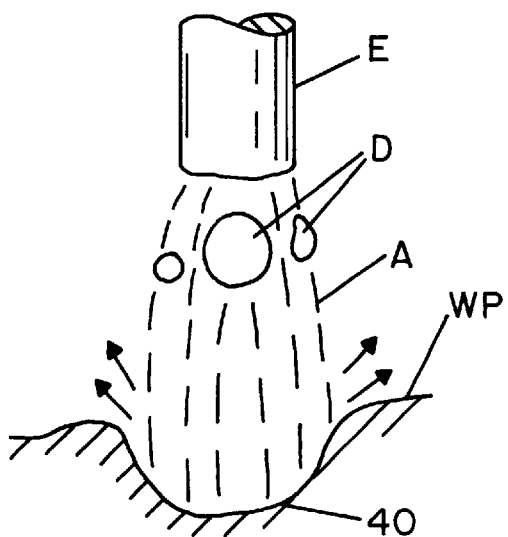
FIGS. 8 and 9 are side elevational views schematically illustrating unwanted operating characteristics of the prior art.
Figure 9:
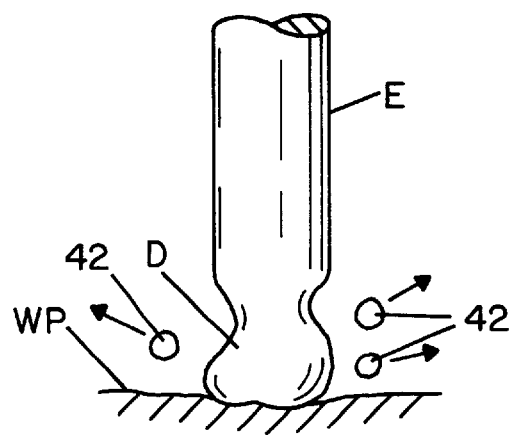

In the past, an increase in the energy of the current pulse could cause drastic puddle depression 40, shown in FIG. 8 with small droplets D being propelled rapidly toward the molten metal forming the workpiece WP). If the pulse energy were decreased, the advancing electrode E could cause a small droplet D touching workpiece WP to create a short causing spatter 42 shown in FIG. 9. By using the present invention, the current pulse C is controlled to provide a single droplet and a transfer with the proper amount of energy during each droplet. The droplets occur at a rate of over 100 current pulses a second so the pulses are changed rapidly. This interactive control of the pulse welding process is novel and produces a superior weld appearance even with low specific gravity metals, such as aluminum.

Figure 10:
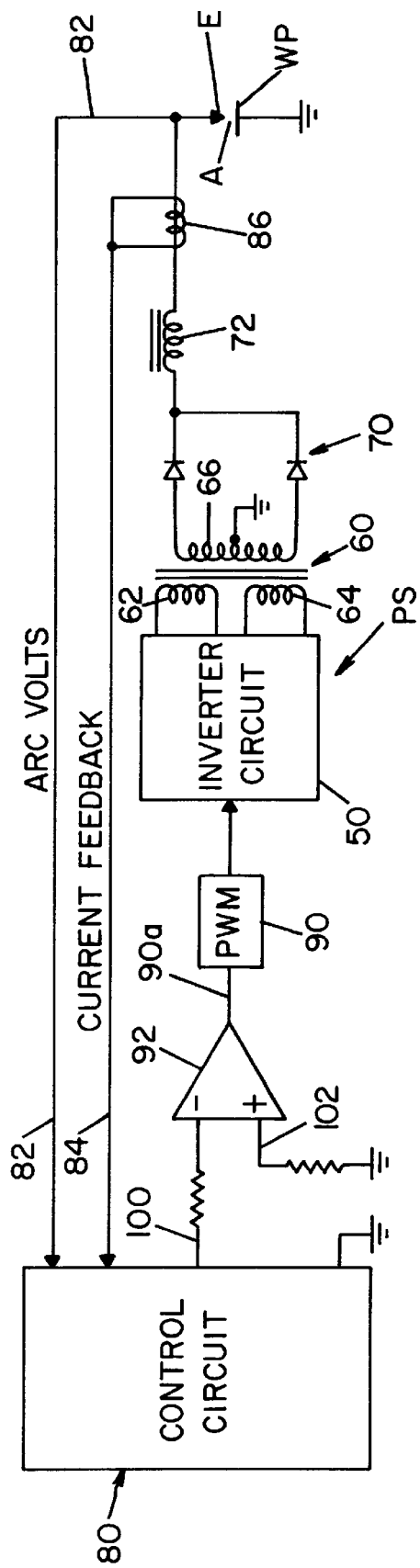
FIG. 10 is a block and wiring diagram schematically illustrating one of several electric arc welders for using the present invention.
Figure 11:
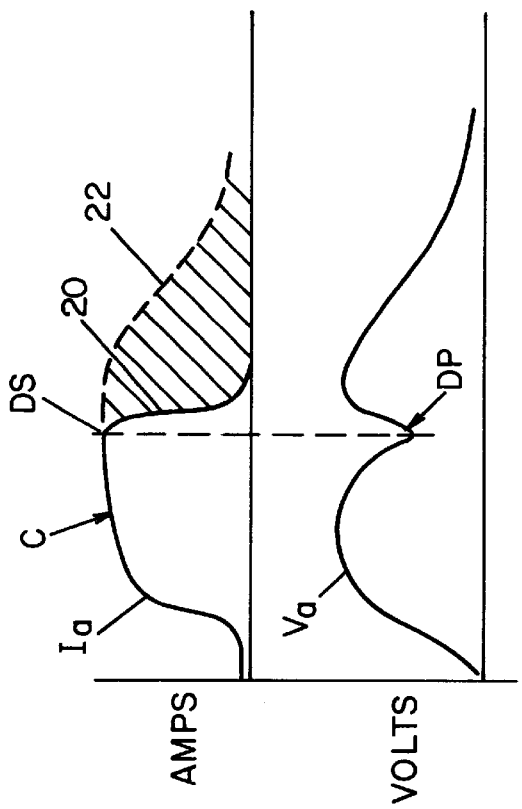
FIG. 11 is a graph showing a current pulse and arc voltage when employing the present invention with a welder shown in FIG. 10.

Various controllers and power supplies used for pulse arc welding can be modified to use the present invention and a variety of analog and digital circuits can be used to implement the invention. Indeed, the digital implementation of some, or a portion of, the invention can be accomplished by software through a computer, such as a microprocessor. A standard controller is schematically illustrated in FIG. 10 wherein power supply PS includes inverter 50 having an output transformer 60 with primary windings 62, 64 and secondary windings 66. Pulses in the secondary winding are rectified by rectifier 70 to create a DC voltage that is directed through inductor 72 to the welding operation defined by advancing metal wire, or electrode, E and workpiece WP. Controller 80 is operated in accordance with a voltage level representing arc voltage $V_a$ and appearing in line 82 to provide a real time voltage signal. In a like manner, real time current signal $I_a$ is directed to controller 80 by a voltage signal in line 84 from current detecting shunt 86. Controller 80 adjusts the operation of pulse width modulator 90 operated at a high frequency in the general range of 10–20 kHz with a duty cycle determined by the voltage signal on line 90a. The control voltage signal 90a is the output of amplifier 92 receiving a command signal on line 100 from controller 80 and a reference signal in line 102. The operation of the welder, as illustrated in FIG. 10, is in accordance with standard technology wherein the signal on line 90a creates a series of pulses to cause a current pulse C between electrode E and workpiece WP. The implementation of the present invention is schematically illustrated in FIG. 11 showing current pulse C and the voltage curve for the welder shown in FIG. 10 when it uses the present invention. At detect signal DS indicating the occurrence of voltage dip DP, the arc current is immediately shifted to a low level, such as zero, as indicated by curve portion 20. Consequently, portion 22 of pulse C is removed from the pulse to obtain the benefits of the present invention.

Figure 12:
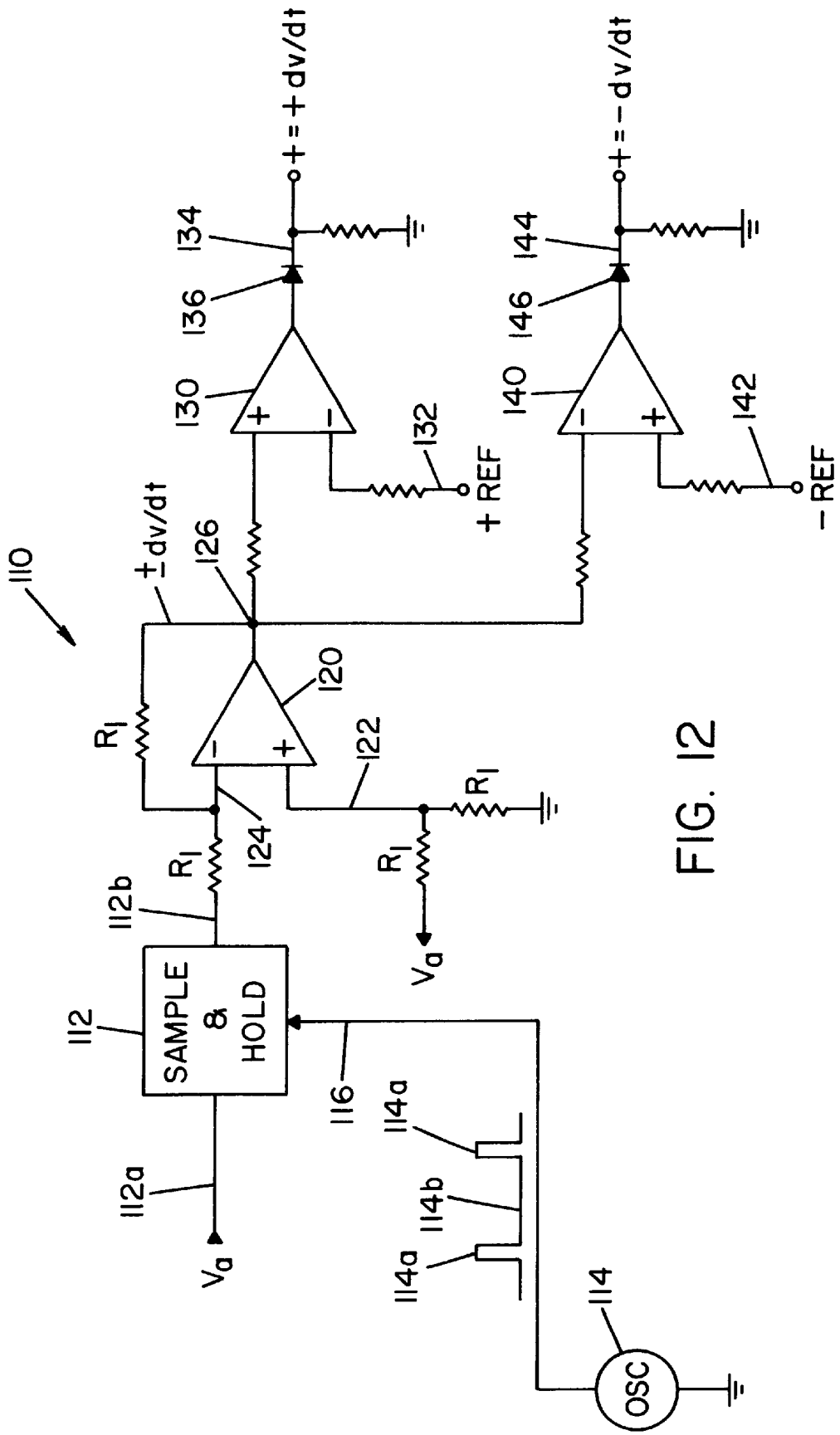
FIG. 12 is a wiring diagram illustrating analog circuit for determining the real time dv/dt of the arc voltage for use in the present invention.

To measure the real time derivative dv/dt, an analog circuit 110 as shown in FIG. 12 is employed. This analog circuit includes a sample and a hold circuit 112 having input 112a and output 112b. Clocking oscillator 114 creates clock pulses 114a which are spaced apart to provide a hold window 114b between the clock pulses. Pulses 114a appear in line 116 to periodically sample the arc voltage appearing on input line 112a. During the hold window 114b, the level or value of the arc voltage is retained. This previous value of voltage appears in output 112b and is compared by comparator 120 with a present value of the arc voltage to produce a voltage derivative in line 126. The signal in line 126 has a magnitude and sign indicated by the previous voltage value on line 124 and the present voltage value on line 122. The real time derivative of the arc voltage appears at output 126 which is periodically updated by sample and hold circuit 112. A positive value threshold detector 130 has a positive reference 132 and an output 134 with a diode 136. A positive dv/dt signal occurs in line 134 when the positive derivative of the arc voltage is greater than a value set by reference 132. In a like manner, a negative value threshold detector 140 has input reference value at line 142 and an output 144 with a diode 146. A logic 1 signal appears in line 144 when there is a negative value for derivative dv/dt, which negative value exceeds the set level of reference 142. Analog circuit 110 creates a logic 1 in line 134 when the real time derivative of voltage is positive and a logic 1 in line 144 when the real time value of the derivative is negative. The logic on lines 134 and 144 controls shift detector 150 illustrated as digital flip-flop 152 in FIG. 14. This feature can be software implemented. Flip-flop 152 has a reset or enable terminal 154 controlled by the logic on gate 156. When this logic is a logic 1, flip-flop 152 is reset to a logic 0 in output 158. Gate 156 has one input controlled by the logic on line 144 and another input controlled by the logic on output 162a of level detector 160. A threshold current value is set by the voltage R on line 164 and the arc current on line 162. When the arc current exceeds the value R on line 164, the logic in line 162a is a logic 1. Thus, gate 156 is enabled by the current exceeding a value R. This happens only during a current pulse C. Consequently, gate 156 is enabled only during a current pulse C. The enable window is controlled by the selection of reference R. During the current pulse a logic 1 in line 144, indicating a negative value to the real time derivative of voltage, resets flip-flop 152 awaiting the clock pulse. A clock pulse is created in line 134 when the real time derivative of voltage shifts to a positive value as indicated at the trailing edge of voltage dip DP. The clock pulse creates a logic 1 in line 158 to trigger one shot circuit 170 having a pulse length determined by the adjustment of the resistor 172. The output of one shot 170 is detect signal DS. As can be seen, when the circuit illustrated in FIG. 14 identifies the existence of voltage dip DP, one shot 170 is initiated creating the detect signal. This signal is maintained for a length of time to assure stability of the circuitry. The circuit so far described could be implemented by analog or digital technology. The digital technology could be implemented by computer software and/or a combination of analog, digital and computer circuit for accomplishing the present invention.

Figure 13:
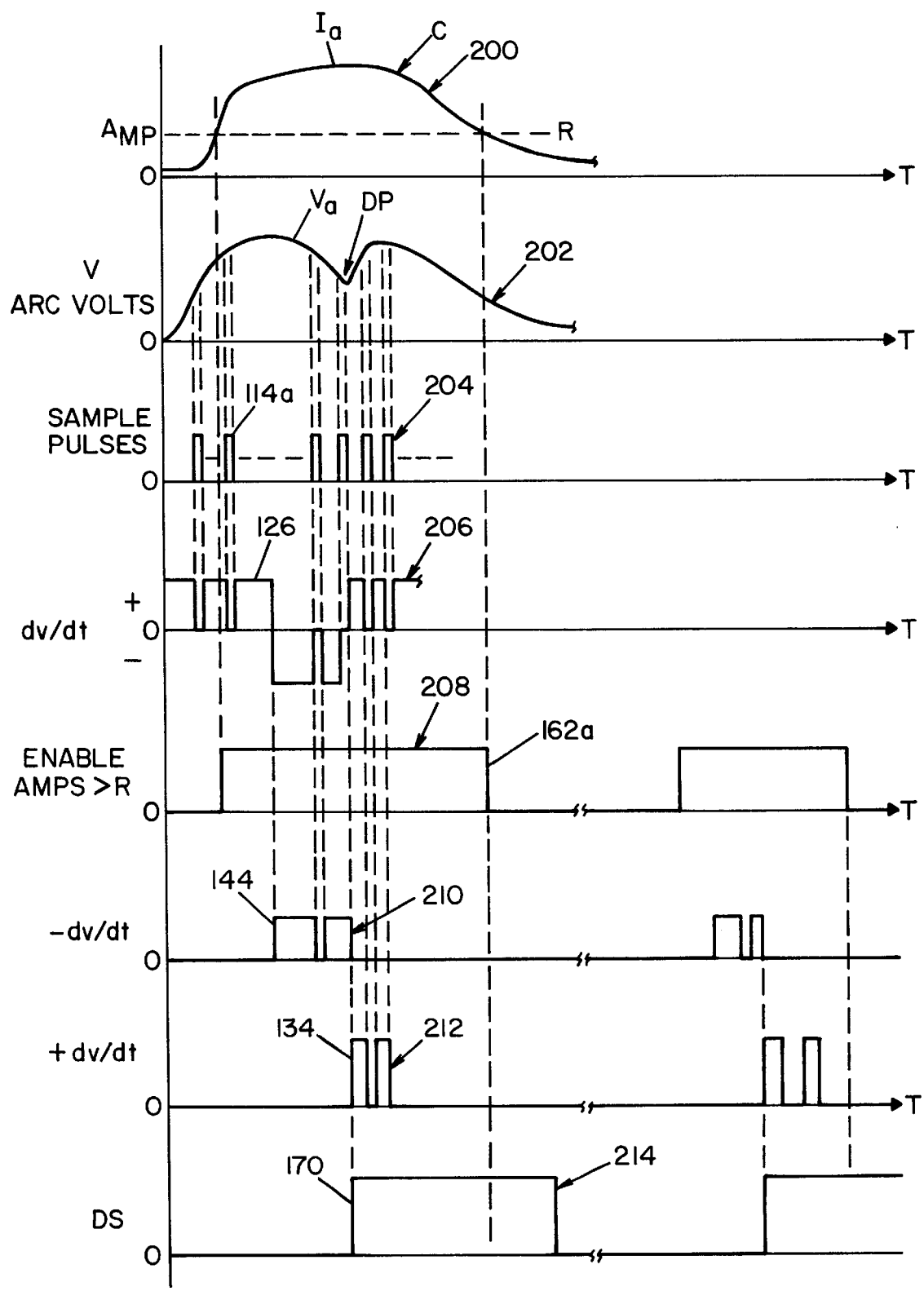
FIG. 13 is a series of graphs showing a current pulse and the related signals used in the preferred embodiment of practicing the invention as illustrated in FIGS. 12 and 14.
Figure 14:
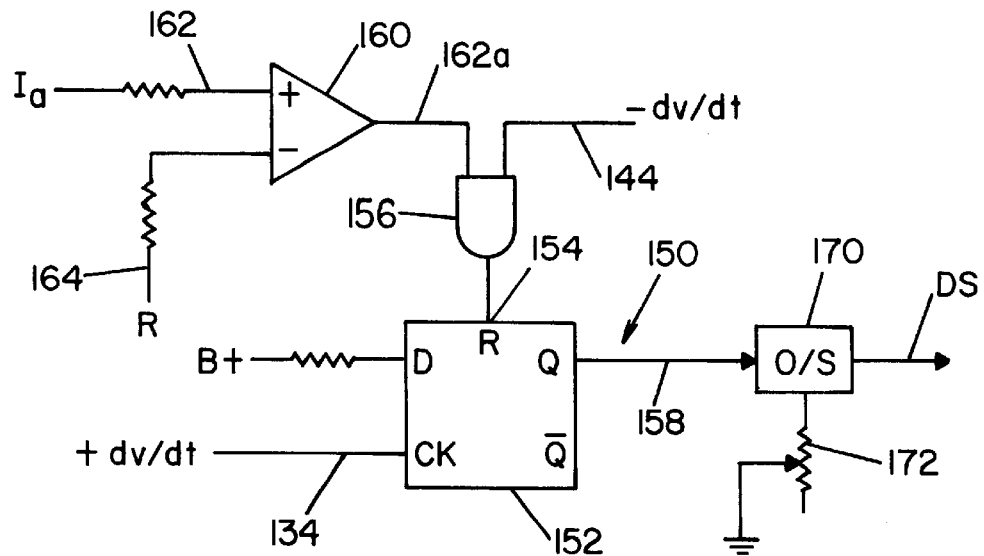
FIG. 14 is a schematic block diagram illustrating the detection circuit utilizing the signals from the circuit of FIG. 12 and creating the signals set forth in FIG. 13.

FIG. 13 represents several signals created by the circuits illustrated in FIGS. 12 and 14. Curve 200 is current pulse C and curve 202 is the arc voltage showing the occurrence of voltage dip DP upon separation of droplet D from electrode E. Sample pulses 114a are shown as curve 204. These pulses create a real time derivative curve 206 at the output 126 of comparator 120. Curve 208 is the enable signal in line 162a. This is compared to the logic in line 144 of curve 210. When these two events occur, flip-flop 152 is reset to a logic 0 if it is not already at a logic 0. The signal indicated as curve 212 is the output 134. When this occurs, and the flip-flop has been reset, the detect signal DS is created at the output of one shot circuit 170 illustrated as curve 214. At the end of the one shot pulse, the detect signal is terminated which occurs after the end of the pulse C. Flip-flop 152 is reset by gate 156 at the next pulse to again trigger one shot 170 for creating detect signal DS.

Figure 15:
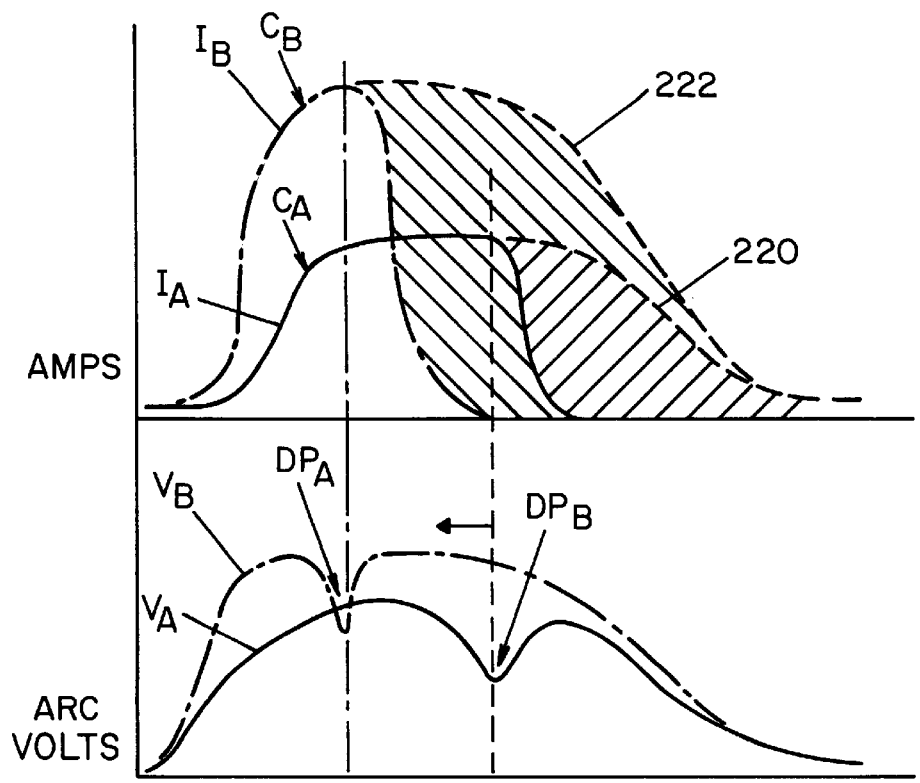
FIG. 15 is a composite graph showing variations in the current pulses and voltages which are accommodated by use of the present invention.

An advantage of using the present invention is illustrated in FIG. 15 where one of two different current pulses is generated during a welding operation. The first pulse $C_A$ is relatively long, whereas the second pulse $C_B$ is relatively short but with a higher value. Both of these current pulses create essentially the same total energy but have different characteristics with respect to the welding process. Irrespective of the shape of the particular pulse generated during the welding process, voltages $V_A$ and $V_B$ have a voltage dip $DP_A$ and $DP_B$, respectively. By using the present invention, the voltage dips initiate a detect signal DS, which detect signal terminates the current pulse. Thus, portions 220, 222 are removed from the two distinct current pulses: $C_A$, $C_B$, respectively. Thus, different shape pulses do not require a different implementation of the present invention. Indeed, if the shape or length of the pulse changes from one pulse to the next in a process, the invention still identifies the exact instant to implement the change in the current pulse to provide the desired output result.

Detect signal DS is used to control the welding process by modifying a parameter such as the command signal in line 100 shown in FIG. 10. In practice, the adjusted parameter is the length of current pulse C which is modified by terminating the pulse. A variety of circuits could be used for accomplishing this control aspect of using the present invention. However, the preferred implementation of this control feature is schematically illustrated in FIG. 16 wherein one shot circuit 170 creates detect signal DS directed to controller 80 having an internal pulse shape or circuit 240 and a pulse rate control circuit 242. The voltage on line 244 includes a series of pulses controlling the duty cycle of pulse width modulator 90 operated at a high speed in the range of 10–20 kHz. An analog, digital, electronic and/or software switch 250 grounds command signal line 100 or line 244 upon creation of detect signal DS. When the command signal on line 100 is grounded, pulse width modulator shifts to a low level for the remainder of the pulse. Thereafter the detect signal is removed by one shot circuit 170 awaiting the next occurrence of a dip DP in the arc voltage $V_a$. In this manner, each pulse awaits the existence of a voltage dip signaled by a reversal in the polarity of the voltage derivative from a negative value to a positive value. These values may have a built-in threshold amounts, as indicated by circuit 110 in FIG. 12. Other parameters of controller 80 could be modified upon creation of a signal DS, maximum current such as pulse shape. The pulse adjustment occurs during the current pulse; however, in accordance with the invention, the parameter could be used to change future pulses without departing from the spirit and scope of the present invention. The invention involves controlling a pulse welding process by sensing the existence of the voltage dip DP. Although the main use of the invention is to control the parameter of the pulse length by terminating the pulse, other parameters can be controlled by the use of the present invention.

As indicated previously, the invention can be reformed by an analog circuit, a digital circuit or a software implementation of digital logic. In practice, a software implementation of the present invention is preferred. Such an implementation is shown as digital circuit 300 in FIG. 17. The input of this circuit is $V_a$ on line 112a and the output of circuit 300 is detect signal DS. The software for reading arc voltage and creating a detect signal can vary. In one implementation, the arc voltage is changed into a digital signal by converter 302. The digital level or word is stored in register 304 upon receipt of a clock pulse in line 310. This clock pulse also causes the digital word to be loaded into register 330, as indicated by block 320. The load function is executed after a time delay indicated by block 312. Thus, a real time number representing the level of the arc voltage is shifted into register 330. A clock pulse in line 310 also loads the previous number in register 330 into register 342 by load block or function 340. The number in register 330 is the present voltage and the number in register 342 is the previous voltage. These two voltages are subtracted by circuit or function block 350 so that the output in line 350a is the subtraction of the previous voltage number from the present voltage number. A magnitude detector or function 252 indicates when the difference exceeds a threshold number X indicated by block 354 to give an output in line 356. Circuit or function block 360 is a sign bit detector which indicates when the sign shifts from a negative value to a positive value for the number in output 350a. A shift between a negative value and a positive value creates a signal in line 362. This signal combined with the signal in line 356 to trigger gate 370 which initiates one shot circuit 170 and creates a detect signal DS as previously discussed. In this implementation of the invention, one shot circuit 170 has a pulse length sufficient to avoid the need for detecting the existence of a pulse as done by level detector 160 shown in FIG. 14. The use of the one shot circuit 170 can overcome the need for the level detector; however, the present invention involves the voltage dip between a negative value and a positive value during the actual current pulse and not at the creation of the current pulse.

Figure 18:
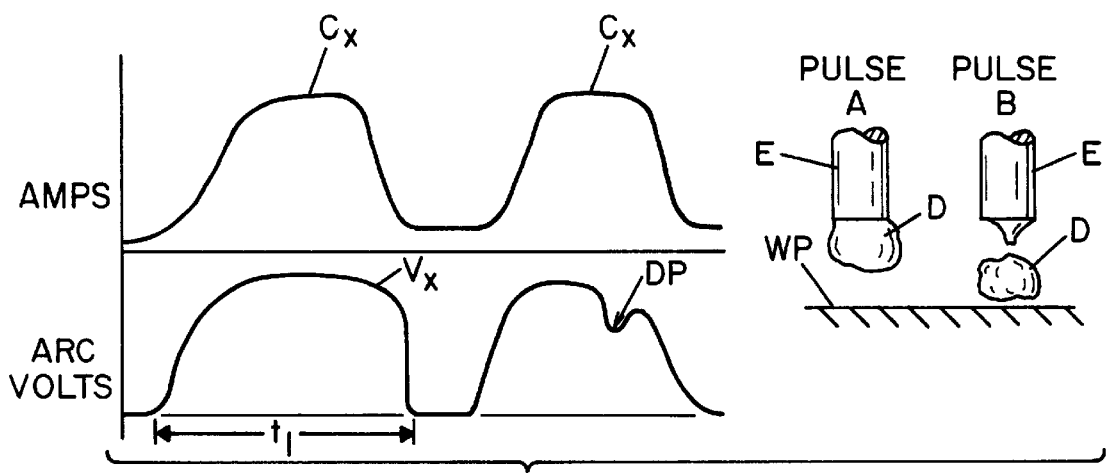
Figure 19:
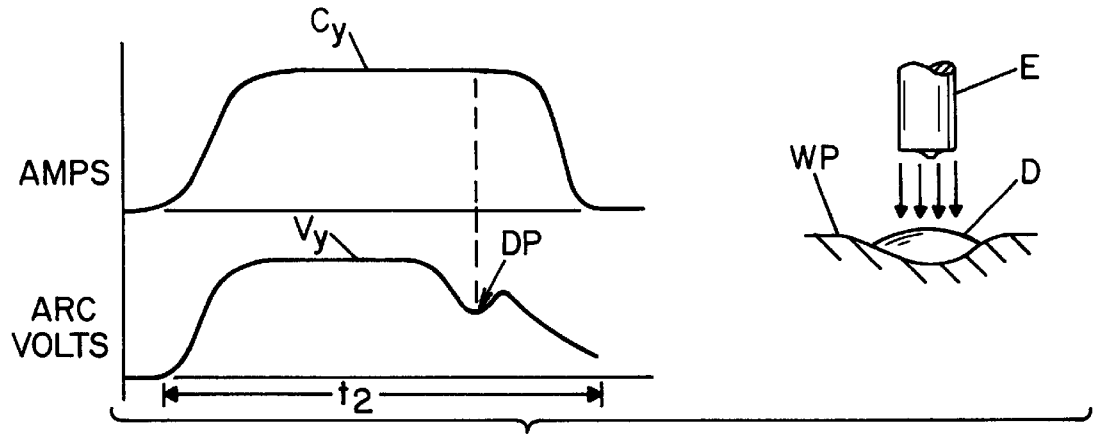
Figure 20:
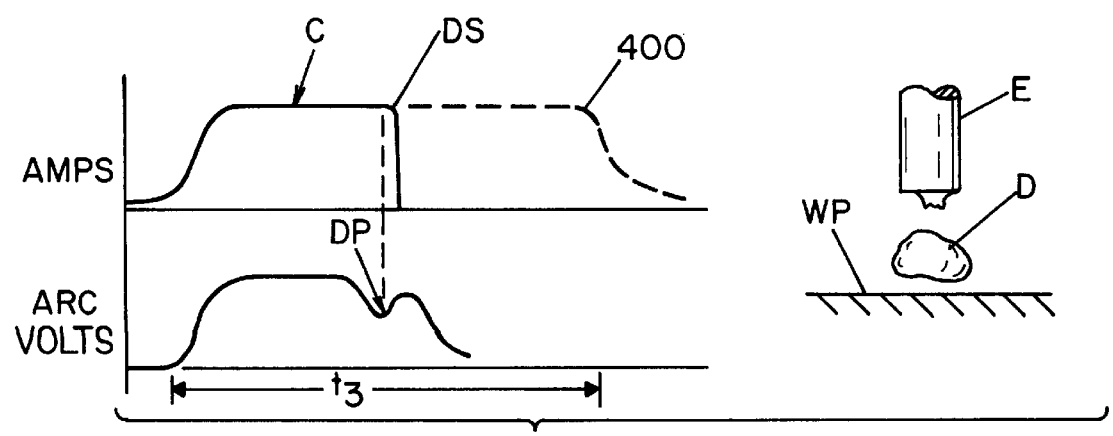

Various structures and circuits could be used for implementing the present invention. A further illustration of the advantage of the present invention is illustrated in FIGS. 18–20. In accordance with the prior art implementation of a pulse welding process, current pulses $C_X$ occur at a predetermined rate. The voltage for creating the current pulses has a length $t_1$. Time $t_1$ is relatively short. The first pulse A does not fully transfer droplet D as represented in the view at the right of FIG. 18. Thus, the welding wire or electrode progresses downwardly without a droplet transfer. The droplet may cause an undesired short before being separated by the next pulse. The next pulse will cause the pinch effect to separate droplet D, as shown as pulse B in FIG. 18. In this situation, the pulse welding process does not transfer a droplet during each pulse. Indeed, in many instances two to three pulses may be required to transfer a droplet. This situation occurs when the length of the pulses $C_X$ is reduced to prevent puddle depression and disturbances. Solving the difficulty explained in connection with the short current pulses of FIG. 18 is the use of a long current pulse $C_Y$ illustrated in FIG. 19. The voltage has a time $t_2$ which causes droplet D to be transferred to the molten metal workpiece WP before current pulse $e_y$ has terminated. This causes the electromagnetic disturbances previously described as puddle depression. This agitation of the weld puddle is schematically illustrated in the right hand portion of FIG. 19. These problems are solved by use of the present invention as shown in FIG. 20 wherein the time $t_3$ is essentially the same as time $t_2$ in FIG. 19. However, dip DP causes a detect signal DS to immediately terminate current pulse C prior to the programmed termination at position 400. By using the present invention, a single droplet is transferred in each current pulse. The length of the current pulse is not critical to the overall performance of the welding process. The use of a detect signal for adjusting the parameter of controller 80 is novel. The present invention relates to improved power supply utilizing the creation of a detect signal when a droplet transfer occurs. A welder can be provided with the present invention by minor changes in the circuitry or in the software. Preferably, the current pulses are created by a pulse width modulator; however, other types of circuitry could be used for creating the current pulses terminated by the creation of detect signal DS.

Having thus defined the invention, the following is claimed:

1. In a power supply for creating a voltage to cause a current pulse between a consumable electrode and a workpiece to melt the end of said electrode into a droplet and propel said droplet toward said workpiece, said power supply having a plurality of pulse controlling parameters, the improvement comprising: means for determining the real time dv/dt of said voltage during said current pulse; means for creating a detect signal in response to said real time dv/dt shifting from a negative value to a positive value; and means for adjusting at least one of said parameters in response to said detect signal.

2. The improvement as defined in claim 1 wherein said parameter is termination of said current pulse.

3. The improvement as defined in claim 1 wherein said parameter is length of said current pulse.

4. The improvement as defined in claim 1 wherein said parameter is voltage level.

5. The improvement as defined in claim 1 wherein said parameter is pulse shape.

6. The improvement as defined in claim 1 wherein said detect signal creating means includes means for creating a positive dv/dt signal when said real time dv/dt exceeds a threshold value.

7. The improvement as defined in claim 1 wherein said detect signal creating means includes means for reading the present voltage value during a current pulse, means for comparing said present voltage value with a prior voltage value to give an absolute difference of the prior value subtracted from the present value and means for detecting when said difference is positive.

8. The improvement as defined in claim 7 wherein said detect signal creating means includes means for storing said previous voltage value before said substraction.

9. The improvement as defined in claim 8 wherein said detect signal creating means includes means for creating said detect signal when said difference is greater than a threshold amount.

10. The improvement as defined in claim 9 wherein said detect signal creating means includes means for determining when said real time dv/dt is negative for a given time to establish said negative value.

11. The improvement as defined in claim 10 wherein said detect signal creating means includes means for creating said positive value only after said negative value and during said current pulse.

12. The improvement as defined in claim 11 wherein said means for creating said positive value includes means for determining when said real time dv/dt is positive for a given time.

13. The improvement as defined in claim 12 wherein said detect signal creating means is an analog circuit.

14. The improvement as defined in claim 13 including a software driven means for implementing said digital circuit.

15. The improvement as defined in claim 12 wherein said detect signal creating means is generally a digital circuit.

16. The improvement as defined in claim 7 wherein said detect signal creating means is an analog circuit.

17. The improvement as defined in claim 7 wherein said detect signal creating means is generally a digital circuit.

18. The improvement as defined in claim 17 including a software driven means for implementing said digital circuit.

19. The improvement as defined in claim 7 wherein said detect signal creating means includes means for creating said detect signal when said difference is greater than a threshold amount.

20. The improvement as defined in claim 19 wherein said detect signal creating means includes means for determining when said real time dv/dt is negative for a given time to establish said negative value.

21. The improvement as defined in claim 7 wherein said detect signal creating means includes means for determining when said real time dv/dt is negative for a given time to establish said negative value.

22. The improvement as defined in claim 1 wherein said detect signal creating means is an analog circuit.

23. The improvement as defined in claim 1 wherein said detect signal creating means is generally a digital circuit.

24. The improvement as defined in claim 23 including a software driven means for implementing said digital circuit.

25. The improvement as defined in claim 1 wherein said detect signal creating means includes means for determining when said real time dv/dt is negative for a given time to establish said negative value.

26. The improvement as defined in claim 25 wherein said detect signal creating means is an analog circuit.

27. The improvement as defined in claim 25 wherein said detect signal creating means is generally a digital circuit.

28. The improvement as defined in claim 27 including a software driven means for implementing said digital circuit.

29. The improvement as defined in claim 1 wherein said detect signal creating means includes means for creating said positive value only after said negative value and during said current pulse.

30. The improvement as defined in claim 29 wherein said detect signal creating means is an analog circuit.

31. The improvement as defined in claim 29 wherein said detect signal creating means is generally a digital circuit.

32. The improvement as defined in claim 31 including a software driven means for implementing said digital circuit.

33. A controller for an electric arc welder using a voltage to create a current pulse to melt the end of a consumable electrode into a droplet and propel said droplet toward a workpiece, said controller includes means for terminating said current pulse upon creation of a detect signal and means for creating said detect signal in response to the real time dv/dt of said voltage during said pulse shifting from a negative value to a positive value.

34. A controller as defined in claim 33 wherein said detect signal creating means includes means for creating a positive dv/dt signal when said real time dv/dt exceeds a threshold value.

35. A controller as defined in claim 34 wherein said detect signal creating means includes means for creating said detect signal when said difference is greater than a threshold amount.

36. A controller as defined in claim 33 wherein said detect signal creating means includes means for reading the present voltage value during a current pulse, means for comparing said current voltage value with a prior voltage value to give an absolute difference of the prior value subtracted from the present value and means for detecting when said difference is positive.

37. A controller as defined in claim 33 wherein said detect signal creating means includes means for determining when said real time dv/dt is negative for a given time to establish said negative value.

38. A controller as defined in claim 37 wherein said detect signal creating means includes means for creating said positive value only after said negative value and during said current pulse.

39. A controller as defined in claim 33 wherein said detect signal creating means includes means for creating said positive value only after said negative value and during said current pulse.

40. A method of operating a power supply for creating a voltage to cause a current pulse between a consumable electrode and a workpiece to melt the end of said electrode into a droplet and propel said droplet toward said workpiece, said power supply having a plurality of pulse controlling parameters, said method comprising the steps of:

(a) determining the real time dv/dt of said voltage during said current pulse;

(b) creating a detect signal in response to said real time dv/dt shifting from a negative value to a positive value; and, (c) adjusting at least one of said parameters in response to said detect signal.

41. The method as defined in claim 40 wherein said parameter is termination of said current pulse.

42. The method as defined in claim 40 wherein said parameter is length of said current pulse.

43. The method as defined in claim 40 wherein said parameter is voltage level.

44. The method as defined in claim 40 wherein said parameter is pulse shape.

45. The method as defined in claim 40 wherein said detect signal creating steps includes the further step of:

(d) creating a positive dv/dt signal when said real time dv/dt exceeds a threshold value.

46. The method as defined in claim 40 wherein said detect signal creating step includes the further steps of:

(d) reading the present voltage value during a current pulse;

(e) comparing said current voltage value with a prior voltage value to give an absolute difference of the prior value subtracted from the present value; and, (f) detecting when said difference is positive.

47. The method as defined in claim 46 wherein said detect signal creating step further includes the step of:

(g) storing said previous voltage value before said substraction.

48. The improvement as defined in claim 46 wherein said detect signal creating step further includes the step of:

(g) creating said detect signal when said difference is greater than a threshold amount.

49. The method as defined in claim 40 wherein said detect signal creating step includes the further step of:

(d) determining when said real time dv/dt is negative for a given time to establish said negative value.

50. The improvement as defined in claim 40 wherein said detect signal creating step further includes the step of:

(d) creating said positive value only after said negative value and during said current pulse.

51. A method of controlling an electric arc welder using a voltage to create a current pulse to melt the end of a consumable electrode into a droplet and propel said droplet toward a workpiece, said method includes the steps of:

(a) terminating said current pulse upon creation of a detect signal; and, (b) creating said detect signal in response to the real time dv/dt of said voltage during said pulse shifting from a negative value to a positive value.

52. The method as defined in claim 51 wherein said detect signal creating step further includes the step of:

(c) creating a positive dv/dt signal when said real time dv/dt exceeds a threshold value.

53. The method as defined in claim 52 wherein said detect signal creating step includes the further step of:

(d) creating said positive value only after said negative value and during said current pulse.

54. The method as defined in claim 51 wherein said detect signal creating step includes the further step of:

(c) reading the present voltage value during a current pulse;

(d) comparing said current voltage value with a prior voltage value to give an absolute difference of the prior value subtracted from the present value; and, (e) detecting when said difference is positive.

55. The method as defined in claim 51 wherein said detect signal creating step further includes the step of:

(c) determining when said real time dv/dt is negative for a given time to establish said negative value.

56. A device for detecting the detachment of a mass of molten metal on the end of a consumable electrode during a current pulse in a pulse welding process, said device comprising: means for determining the real time dv/dt of the voltage creating said current pulse and means for detecting when said real time dv/dt shifts from a positive value to a negative value during said current pulse.

57. A method of detecting the detachment of a mass of molten metal on the end of a consumable electrode during a current pulse in a pulse welding process, said method comprising: determining the real time dv/dt of the voltage creating said current pulse and detecting when said real time dv/dt shifts from a positive value to a negative value during said current pulse.

* * * * *